Dec. 27, 1966  R. F. ANDERSON  3,293,823
CAPPING APPARATUS
Filed Nov. 14, 1963  6 Sheets-Sheet 1

Fig. 1

Inventor
Ralph F. Anderson
By McCanna, Morsbach & Pillote
Atty's

Inventor
Ralph F. Anderson
By McCanna, Morsbach & Pillote
Atty's

Inventor
Ralph F. Anderson
By McCanna, Morsbach & Pillote
Atty's

Dec. 27, 1966  R. F. ANDERSON  3,293,823
CAPPING APPARATUS

Filed Nov. 14, 1963  6 Sheets-Sheet 5

Inventor
Ralph F. Anderson

By McCanna, Morsbach & Pillote
Atty's

United States Patent Office 3,293,823
Patented Dec. 27, 1966

3,293,823
CAPPING APPARATUS
Ralph F. Anderson, 332 Calvin Park Blvd.,
Rockford, Ill. 61107
Filed Nov. 14, 1963, Ser. No. 323,652
14 Claims. (Cl. 53—131)

This invention relates to novel and useful improvements in capping mechanisms and more particularly to apparatus for feeding and applying caps to containers.

For a number of years the food distribution industry has increasingly used light-weight covered wide-mouthed containers, usualy made of paper, for the distribution and sale of numerous comestibles, of which cottage cheese, ice cream, etc. are well known and sufficient examples. Rapid, automatic filling and capping of such containers is an economic necessity in reducing the cost of such containers so that they may profitably be used extensively. The food machinery industry has, however, had considerable difficulty in meeting this need of the food distribution industry, particularly in the matter of capping containers with skirted covers in high speed operations. One problem was to provide assurance during high speed operations that the cover be properly aligned with the mouth of the container at the time capping pressure is applied to the cover. This invention solves that problem.

The apparatus of this invention is especially well suited for use in connection with container filling machines of the type disclosed in the patent to S. F. Anderson, No. 2,029,299, wherein the containers are carried by a conveyer from a loading station succesively past a filling station and a capping station, the containers being momentarily elevated at the filling station and again at the capping station to be respectively filled first and next covered, and subsequently lowered back again onto the conveyer for further movement therewith. This capping apparatus may, of course, be used with container filling equipment other than that shown in said patent.

Some of the prior apparatus for the feeding and applying of pre-formed skirted covers to containers has provided for the removal of the skirted covers from magazines, which hold them in inverted positions, and the transferring of the covers to another position in which the skirts extend downwardly, and relying on other separate apparatus for placing and pressing the covers onto the containers.

This invention provides an improved mechanism in which skirted covers stored in a magazine in an inverted position are removed from the magazine one at a time, reversed to present the skirts extending downwardly, and are then applied with a high degree of accuracy directly to the containers by the same mechanism which has removed them from the magazine.

Another object of this invention is to provide an apparatus capable of performing the foregoing described operations and having means operated in timed relation therewith for applying vacuum to a suction cup at the time it is ready to seize a cover or a liner from a magazine, to maintain that vacum while the cover or liner is being transferred to a container and to disconnect that vacuum and preferably apply positive air pressure to the suction cup when it reaches the container, primarily to make certain that if a cover or liner is not transferred, the suction cup will not draw into the vacuum system any of the product then reposing in the container.

Another object and advantage of this invention is to provide coding means for printing upon the covers any desirable code designation simultaneously and in conjunction with the operations of transferring the skirted caps from the magazines to the containers to which they are applied and in such a manner as to preclude contamination of the material in the containers in the event of a malfunction in the capper.

Another object of the invention is to provide coding means which may optionally be attached to or detached from the capping apparatus, or temporarily be rendered inoperative in a very simple manner.

In the event that the user of this apparatus desires to first place on top of a filled container a liner or sheet of parchment, which usually is quite flexible, for covering the comestibles in such containers, this invention also provides a magazine containing such liners and means for extracting the liners one at a time from the magazines and transferring them to the tops of the filled containers at one adjacent step just preceding the operation of applying the covers.

Another object of the invention is to provide an apparatus adapted to perform the foregoing operations in a simplified manner, with a minimum of moving parts and with provisions for adapting the apparatus to handle containers of various sizes and shapes as well as covers for them.

Another object of the invention is to provide means for applying simultaneously, though at separate stations, liners and covers to containers, the liner applying portion of the apparatus being optionally rendered operational or inoperational so that a single machine may perform both or one operation as the needs of the user may require.

These, together with various ancillary objects and advantages of this invention will be more readily appreciated as the same becomes better understood by reference to the following detailed description when taken in connection with the accompanying drawings:

Figure 1:
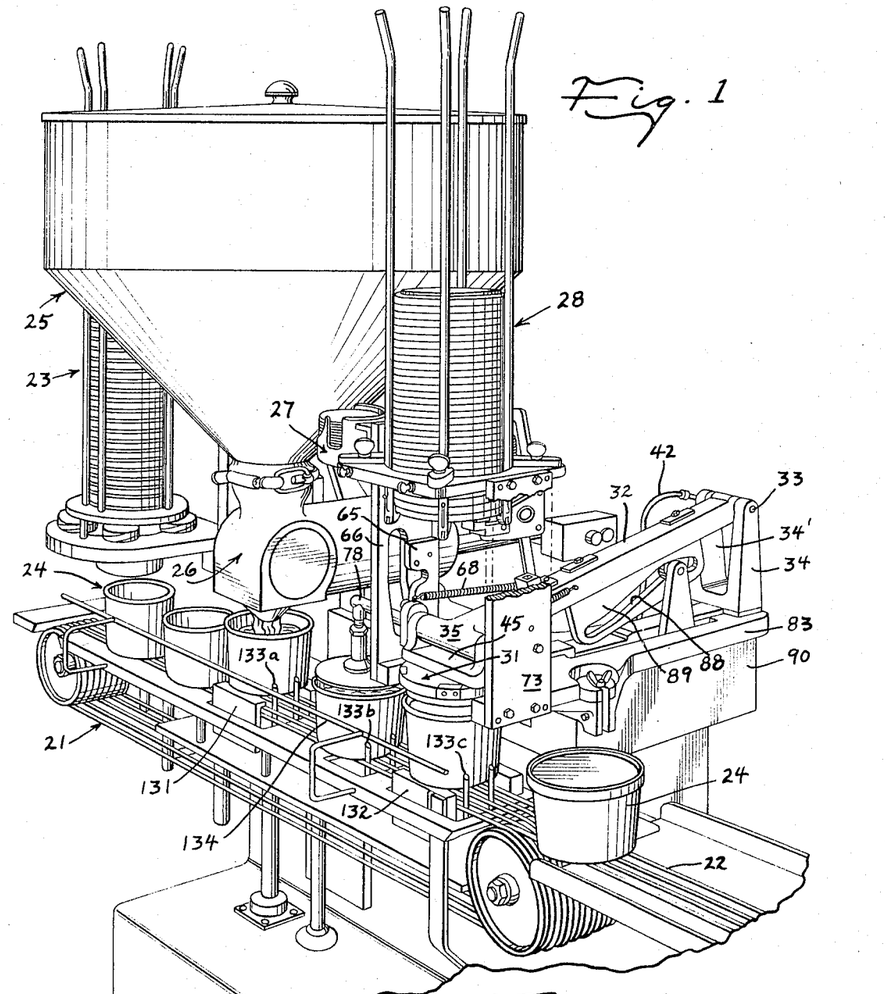
FIGURE 1 is a perspective view of an apparatus made in accordance with this invention shown in juxta-position with apparatus for depositing the containers on a conveyer, filling apparatus for filling the containers, followed by the apparatus of this invention for placing a liner on top of each container and thereafter a cover.

Referring to FIGURE 1 of the drawings, the apparatus therein shown includes an endless conveyor 21 consisting of endless belts, preferably spirally wound wires, for conveying the containers through the filling and capping stages. A take off conveyor 22 receives the filled and capped containers. A magazine 23 stores the containers 24 to be filled, and a hopper 25 contains the product which is delivered to the containers through the filling apparatus 26.

As it is sometimes desirable to place upon the top of the product in the container, a thin sheet of parchment or sheet of other material prior to application of a cover, there is provided a liner magazine 27 adjoining a cover magazine 28. A suction transfer cup 29 is provided for transferring the liners from the liner magazine to the tops of the filled containers, and a suction transfer head generally indicated as 31 serves to transfer the container covers from the magazine 28 and actually apply them to the tops of the containers. For supporting the suction transfer head 31 for the covers, there is provided an arm 32 which may be an inverted U-shaped channel having one end pivotally mounted by a shaft 33 upon upstanding brackets 34 and 34', as shown in FIGURE 1. The other end of arm 32 is welded or otherwise rigidly secured to a tube 35 (FIG. 9), the tube being provided with bearing sleeves 36 and 37 which rotatably support a rod 38 having a longitudinal passage 39 connected with the annular chamber 39' through which either suction or air pressure may be applied to the transfer heads for the liners and the container covers.

Figure 10:
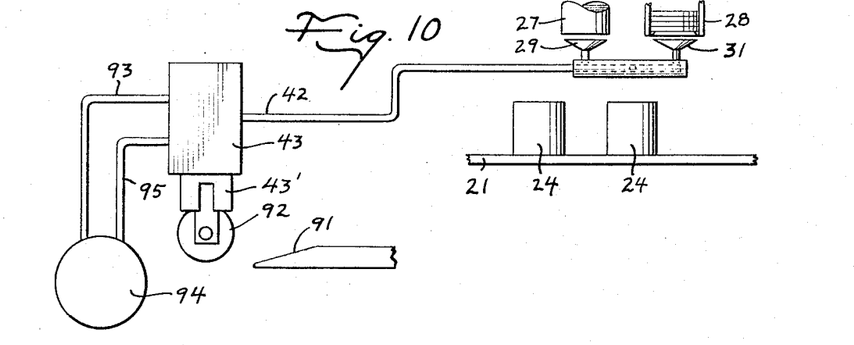
FIG. 10 is a schematic showing of the air supply system for applying suction to the suction cups.
Figure 11:
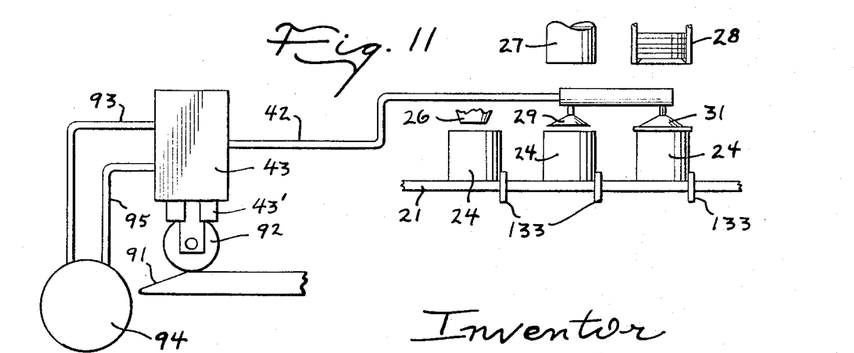
FIG. 11 is an additional schematic view of the air system showing the manner in which the suction is cut off from the suction heads and positive air pressure is supplied thereto.

Air and suction alternatively are applied or connected to the passages 39 and 39' by means of a tube 40 extending along and within the U-shaped channel arm 32 and connected at its other end to a passage (not shown) in the shaft 33 on which the arm 32 is pivotally mounted. Sealing rings such as 41 are provided to seal off the ends of chamber 39'. The tube communicates with the passage in the shaft 33 intermediate the ends of the latter and the passage opens at one end of the shaft and is connected through a flexible tube 42 to a conventional three-way valve 43. The valve 43 has vacuum and pressure inlet ports 93 and 95 connected to the vacuum and pressure sides of a conventional vacuum passage 94 (FIGS. 10 and 11), and a valve member 43' which is movable from one position communicating the vacuum port with the tube 42 and a second position communicating the pressure port with the tube 42. A mechanism described more fully hereinafter is provided for operating the valve in proper timed relation with the movement of the capper.

Figure 3:
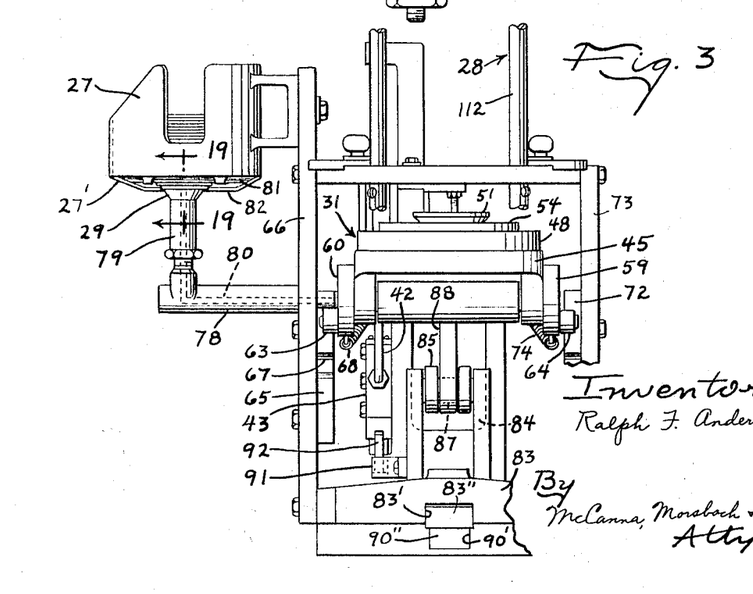
FIG. 3 is a front elevation of a portion of the apparatus showing both the liner suction cup and the cover suction cup.
Figure 4:
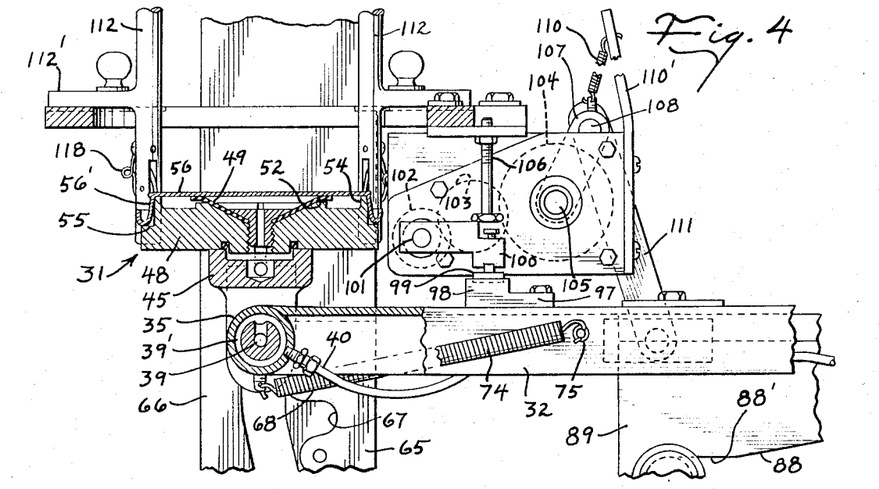
FIG. 4 is a view, partly in aid elevation and partly in section, showing particularly a suction cup gripping an inverted cover positioned in a magazine therefor.
Figure 5:
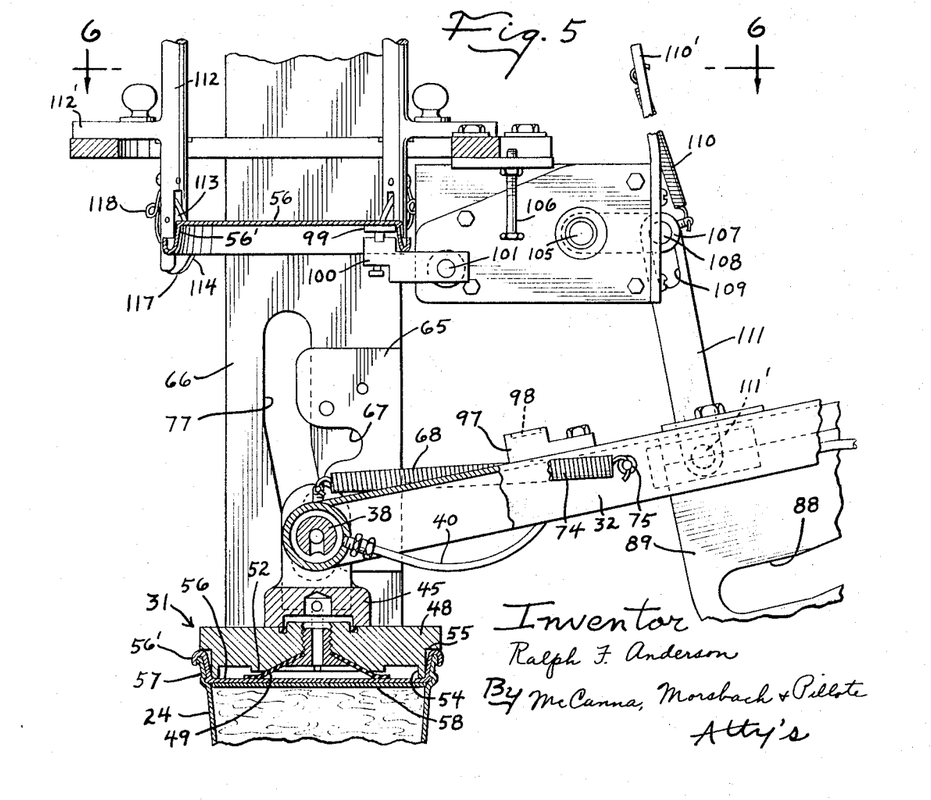
FIG. 5 is a view partly in section taken on the line 5—5 of FIG. 6.
Figure 6:
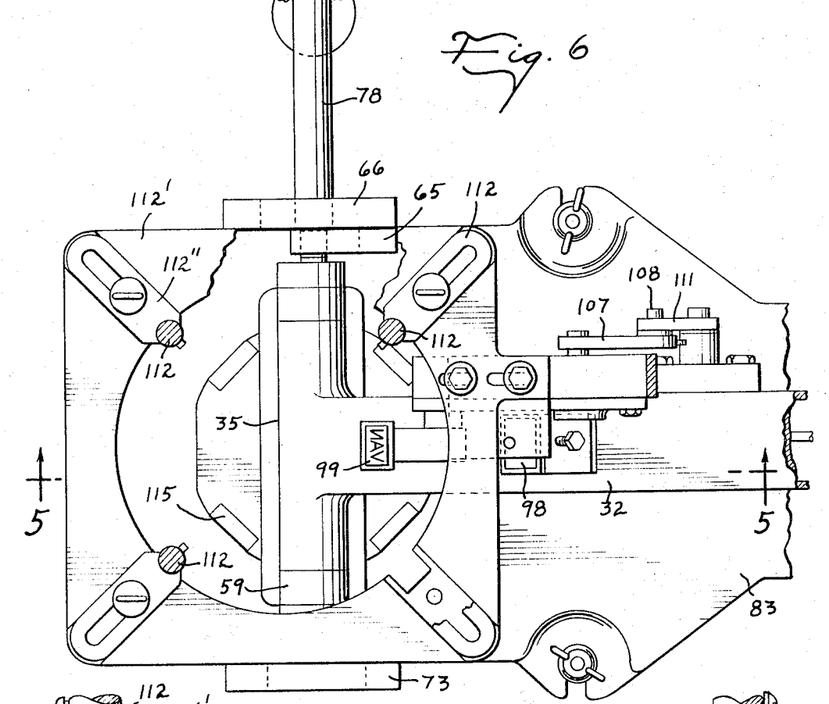
FIG. 6 is a top plan view taken from the position of the line 6—6 of FIG. 5.
Figure 9:
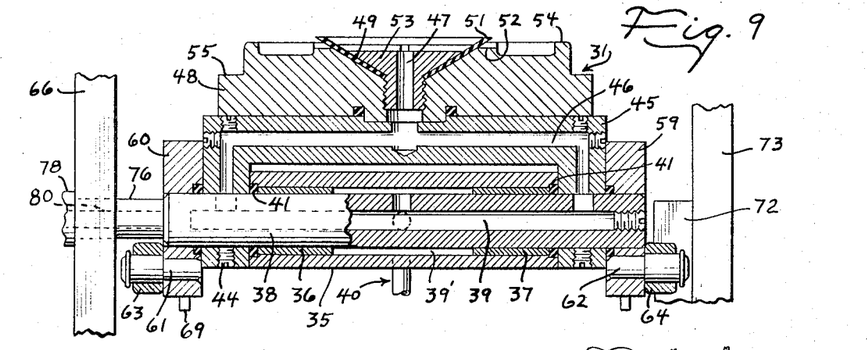
FIG. 9 is a sectional view showing a cover transfer suction head as it is pivotally supported on an operating arm therefor.

Fixed upon the shaft 38 in any suitable manner, for example, by set screws such as 44, is a suction head carrier 45. The carrier has an air passage 46 therein, which as shown in FIG. 9, communicates with the passage 39 and also communicates with a passage 47 in a transfer head 48. This transfer head 48 should be designed and proportioned to conform to whatever container cover it is required to handle, and is detachably secured in any suitable manner to the carrier 45. The transfer head has a generally annular configuration and a suction cup 49 is mounted on the head. The cup has a highly flexible rim 51 which, when not in contact with the container covers, stands somewhat above the suction head and as shown in FIG. 9 and also in FIG. 3. When this suction cup is engaging a container cover, as seen in FIG. 4, and holding it by suction, the rim 51 is distended and folds down upon the annular shoulder 52, which provides a rigid support therefor. A threaded plug 53 is employed to seat the suction cup 49 firmly in the transfer head. Surrounding the suction cup and spaced therefrom is an annular rim 54 proportioned to snugly engage the mouth spanning portion of the cover 56 at its juncture with the skirt 56' on the cover, and a shoulder 55 which is spaced radially outwardly and axially offset from the rim 54 to engage the offset flange on the cover skirt. The rim 54 as seen in FIGS. 4 and 5, cooperates with the annular shoulder 55 and the suction cup 51 to accurately and firmly center and seat the cover on the transfer head 48 and also to seat and firmly apply the container cover 56 accurately to the rim portion 57 of a container 24. It will be observed, as shown in FIG. 5, that the transfer head upon entering the container itself assures that the cover and container will be in perfect alignment. The container shown in FIG. 5 represents a container that has been filled and in which a liner 58 has been placed previously to the seating of the container cover 56.

Referring again to FIG. 9, the transfer head 48 is secured to the carrier 45 by fasteners such as screws. A pair of hubs 59 and 60 are secured to opposite ends of the carrier 45 for movement therewith and laterally extending pins 61 and 62 are provided on the hubs and rotatably support rollers or cam followers 63 and 64 disposed eccentric to the shaft 48. The rollers cooperate with cams described hereinafter for rotating the transfer head 48 and shaft 38 relative to the tube 35 which is carried by the arm 32, as explained heretofore.

Figures 2, 19:
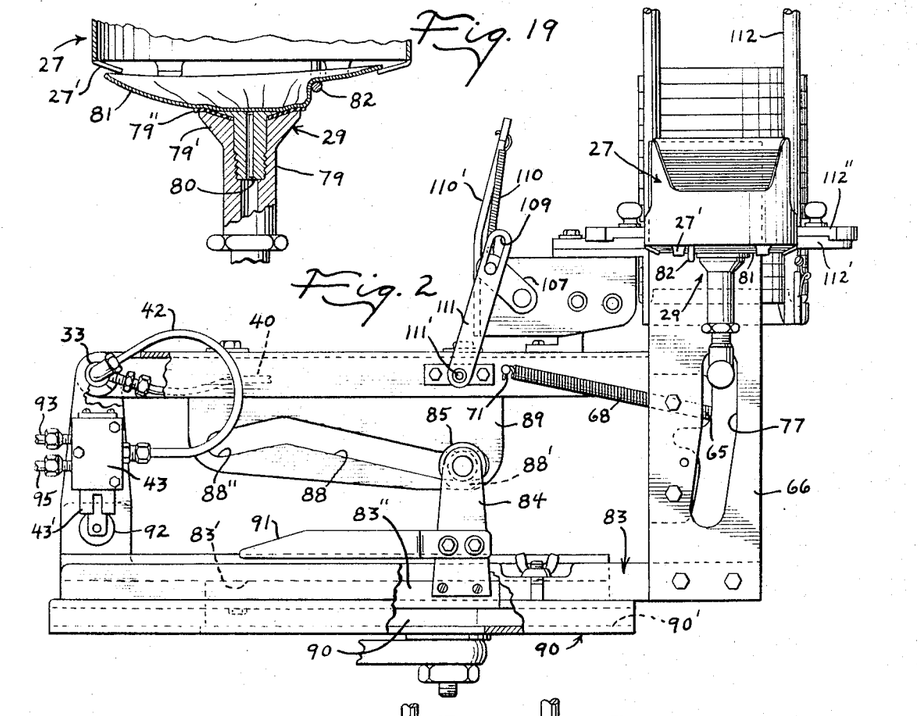
FIG. 2 is a side elevation of a portion of the apparatus of this invention, viewed independently of the filling and conveyer mechanism shown in FIGURE 1, showing the suction cup for removing liners at the position in which it will be ready to grip a liner by suction.
FIG. 19 is a fragmentary sectional view through the parchment magazine and the suction cup for feeding papers therefrom.

One of the cams 65 for coaction with the rollers is shown in FIG. 5 and is itself supported on the upstanding post 66, best shown in FIG. 1. This cam 65 has a recess 67 into which the associated roller 63 is moved or pulled by spring 68 connected to an ear 69, the other end of the spring being supported on a pin 71 fixed on the arm 32, as shown in FIG. 2. Another cam 72 supported on the unstanding post 73, (FIG. 3 and 4) performs a similar function with the roller 64, aided by a spring 74 whose other end is likewise supported on a pin 75. During the upward swing of the arm 32 from the position shown in FIG. 5 to the position shown in FIG. 4, the movement of the rollers into and out of the recesses such as 67 of cam 65 and a corresponding recess (not shown) in the cam 72 causes a substantially 180° reversal of the position of the transfer head, as shown in FIGS. 4 and 5.

The hollow shaft 38 which rotates with the transfer head for the container covers has a reduced portion 76 which extends through a vertical aperture 77 in the post 66. A parchment applying apparatus is also mounted on the shaft 38 for movement therewith and for this purpose, the shaft 38 has a portion 78 of greater diameter to which is fixed in any suitable manner, a post 79 which carries the suction cup 29 adapted for transferring a thin liner such as 81 from the magazine 27 to the tops of filled containers which are successively brought by the conveyer 21 to a position under that suction head, as shown in FIG. 1. The shaft portion 78 and the post 79 are provided with connecting internal passages designated 80 in FIGS. 3, 9 and 19, for supplying either vacuum or air pressure to the liner transfer cup 29 simultaneous with the application of vacuum or pressure to the capper head. As best shown in FIG. 19, the suction cup 29 includes a cup-shaped support 79′ and a resilient cup 79″ on the end of the support.

Inasmuch as the liners are usually thin papers or thin parchments, they require special support. For this purpose, the liners are supported at their peripheries by fingers 27′ that extend inwardly from the liner magazine 27 to underlie the liners and one or more wires or small rods 82 are positioned and supported in any suitable manner to extend across the underside of the magazine 27 to underlie and support the bottommost liner. In the preferred form illustrated, a single support rod 82 is used and arranged to extend across the underside of the stack of liners at a point offset from the center of the stack. The suction cup 29 makes contact with the lowermost liner approximately centrally thereof and, when vacuum is applied, this liner is readily pulled down past the horizontal wire 82 as shown in FIG. 19 and thereafter the suction cup retains the liner until it can be transferred to the top of the filled container, as indicated in FIG. 1. Since the air passage in the shaft 38, 78 is common to both suction heads, vacuum will be applied simultaneously to both suction cups and, when the suction cups are brought down on the tops of the filled containers, air pressure is substituted in these cups for the vacuum. This will serve the dual purpose of instantly releasing the liner in the one case and the container cover in the other case and, by the use of positive pressure in each cup, making it impossible for product to be drawn by suction into these suction cups should there be an absence of a liner being transferred by the liner cup and a cover by the other cup.

As disclosed more fully in the aforementioned Anderson Patent No. 2,029,299, the filling machine includes a capping head support 90 having a guideway 90′ therein and a slide 90″ mounted for horizontal reciprocation in the guideway in a direction crosswise the direction of movement of the conveyor 21. The filling machine has a drive mechanism for advancing the containers in step fashion from the cup loading station successively past the filling station, the liner applying station and the capping station, and mechanism is provided for reciprocation of the shuttle in timed relation with the advance of the containers. This drive mechanism is all fully disclosed in the aforementioned patent and detailed illustration and description is deemed unnecessary. The cap and liner applying mechanism disclosed herein is specifically adapted for use with a filling machine of this type and the liner and cap applying apparatus is particularly designed to be mounted on the support 90 of such a machine and operated by the slide.

Referring now particularly to FIGS. 1, 2, 3, 10 and 11, the liner and cap applying apparatus includes a base 83, which base is detachably clamped to the support 90 as by the wing nuts shown and has a guideway 83′ therein registering with the guideway 90′. The mechanism for causing the arm 32 to oscillate about its pivot 33 consists of a shuttle 83″ keyed to the slide 90″ for movement therewith and slidably disposed in the guideway 83′. A pair of upstanding arms 84 are attached to the shuttle and extended upwardly through openings in the top of the base 83. The arms pivotally support a roller 87 that passes through a cam slot generally indicated at 88 provided in the cam plate 89. The cam plate 89 is attached to the arm 32 for limited adjustment longitudinally of the arm and extends downwardly therefrom. Spacers 85 are on opposite sides of the cam plate to center the same between the arms 84. As previously described, a drive mechanism (not shown) causes the slide 90″ and shuttle 83″ to reciprocate horizontally in timed relation with the motion of the conveyer system. The cam slot 88 is shaped so as to effect vertical movement of the arm 32 as the slide reciprocates and, as best shown in FIG. 2, has an intermediate portion that is inclined to the path of movement of the shuttle, a forward end portion 88′ that extends generally horizontal when the arm 32 is in its raised position; and a rear end portion 88″ that extends generally horizontal when the arm is in its cover position.

A valve actuator, conveniently in the form of a cam 91 is secured in fixed relation to the shuttle to reciprocate therewith. When the cam 91 occupies the position shown in FIGS. 2 and 10, the valve actuator wheel or roller 92 on threeway valve 43 is at rest in the position shown in FIGS. 2 and 10, at which time vacuum is being applied to both of the suction cups, through the line 93 from the vacuum pump 94. However when the cam 91 is moved, to the position shown in FIG. 11, vacuum is cut off and air pressure from the discharge side of the vacuum pump 94 is supplied to the suction cups through line 95 for purpose heretofore described. When the cam 91 reaches the position shown in FIG. 11, the roller carried by the shuttle extending to the cam slot 87 will have moved over to the end portion 88″ of the cam slot 88 and will have caused both suction cups to be lowered to present the liner and the container cover to respective ones of the containers on the conveyer.

In connection with the packaging of products, often times comestibles, in containers of the character shown in the drawings, it is frequently desired to print something upon the cover of the container, usually in the nature of an identifying or dating code, and such a printing mechanism, herein termed a coder, is provided. As shown in FIG. 4 and 5, an ink pad holder 97 supporting an ink pad 98 is mounted in any suitable manner on top of the arm 32 in a preselected position. When the arm 32 is in the angular position of FIG. 4, which it occupies at the time that the cover transfer suction cup is gripping the lowermost cover in the magazine stack, this ink pad will have been raised into contact with a code character plate 99 carried on the coder 100. The coder is in the form of an arm pivotally supported on a shaft 101 and a means is provided for moving the coder from the ink receiving position shown in FIG. 4 to a code applying position as shown in FIG. 5, in timed relation with the movement of the capper. For this purpose, a spur gear 102 is provided on the shaft 101 and meshes with a train of spur gears 103 and 104, the last of which is secured upon a shaft 105. An adjustable stop bolt 106 limits retractive movement of the coder 100 to support the same in position to be engaged by the ink pad 98. An arm 107 also fixed on shaft 105 carries a roller or a pin 108, engaged with a slot 109 in a link 111 pivoted at 111′ on one side of the oscillatable arm 32. It is apparent that when the arm 32 moves downwardly from the position shown in FIG. 4, carrying one container cover with it held by suction on the cup 49, the ink pad will first become disengaged from the code printer 101 and thereafter the arm 107 will be rotated and pulled down by the link 111, causing the train of gears to rotate the code printer 101 into the position shown in FIG. 5 where the printing characters 99 on the coder will strike the inverted top face of the next succeeding container cover 56 and print thereon the message carried by the coder. A restoring spring 110, supported on bracket 110′ is suitably connected to the arm 107 for retracting the coder 100 as the arm 32 moves upwardly. The lost motion between the capper arm 32 and coder operating arm 107, provided by slot 109 enables the coder 100 to return to a position against the stop 106 just prior to the arm 32 reaching its fully raised position shown in FIG. 4.

Figure 7:
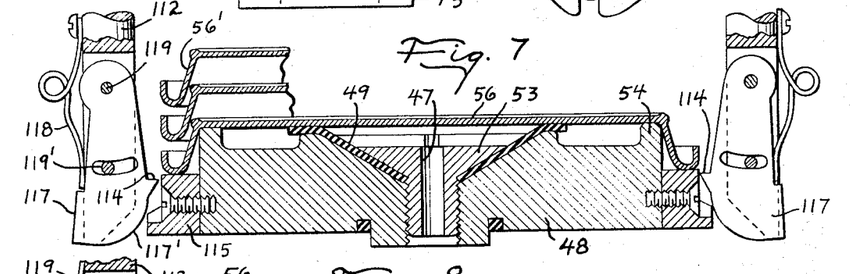
FIG. 7 is a view, partly in section on a larger scale, showing a transfer head in position for suction gripping of a container cover.
Figure 8:
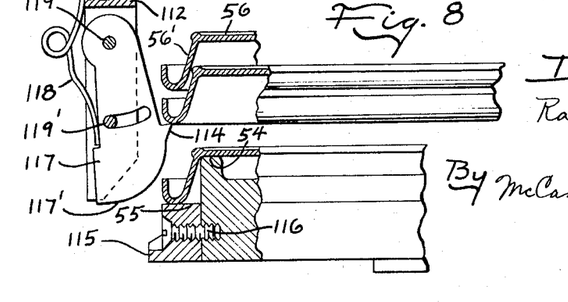
FIG. 8 is a view of a portion of the apparatus of FIG. 7 showing the transfer head being lowered from a stack of container covers, with one cover gripped by the transfer head.

The cover magazine 28 is arranged to support the covers in an inverted position and is advantageously made adjustable to accommodate covers of different size. The cover magazine includes a plurality of generally vertical cover guide rods 112 which are mounted on a support ring 112' for adjustment in a generally radial direction, as by brackets 112''. The support ring is conveniently mounted on the posts 66, 73 and is positioned to overlie the conveyor 21. A means is provided for retaining the stack of covers in the magazine and releasing them one at a time as the lowermost cover is withdrawn by the capping head. In the form shown in FIGS. 7 and 8, the lower ends of the rods 112 are slotted and latches 117 are pivotally mounted in the slots by pins 119 for swinging movement in a direction generally radially of the support ring 112'. The latches have a finger 114 which is shaped to underlie the lowermost cover in the stack and a spring such as shown at 118 is provided to yieldably urge the latches into engagement with the lowermost cover. A means such as a stop pin 119' on the rods extends through an arcuate slot in the latches to limit inward swinging movement. The latches are automatically moved to a cover release position, when the cover applying head moves into a position to engage a cover in the stack. As shown in FIGS. 7 and 8, the head 48 has cam blocks 115 thereon which engage cam faces 117' on the lower ends of the latches to force the latches outwardly when the head is in a cover seizing position. As the head is lowered, the latches move inwardly to underlie and support the next adjacent cover. The cam blocks may be mounted on the head in any suitable manner and, as shown, are disposed in notches in the periphery of the capper head and are detachably secured to the head by fasteners 116.

Figure 12:
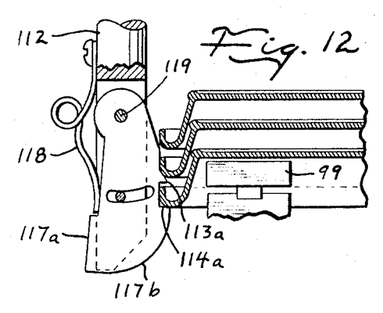
FIG. 12 is a detail view showing a latch provided with a cover magazine not only for holding the bottom cover in the stack for supporting it vertically but also providing a finger for holding that cover downwardly against being lifted when a code printer is applied to the cover.
Figure 13:
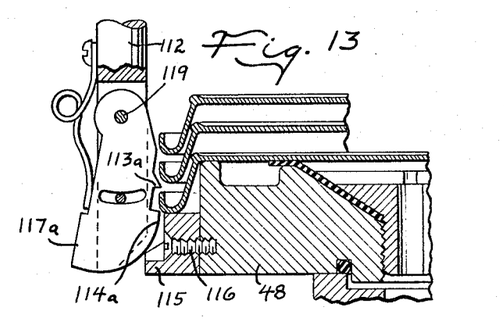
FIG. 13 is a detail showing another position of the latch mechanism when it has been released by the cover transfer suction head.

At the time this code printing takes place, it is desirable that the bottommost cover in the magazine be held rather firmly so that the coder may strike it with substantial force without dislodging it. For this purpose a modified form of latch is provided and arranged to also inhibit upward movement of the lowermost cover in the stack during the coding operation. One such latch is shown in FIGS. 12 and 13. The latch designated 117a is generally similar to the latch 117 previously described and is pivotally supported on a pin 119. The latch 117a has a first finger 114a which underlies and supports the lowermost cover and a second finger 113a that overlies the upper periphery of the lowermost cover in the magazine to prevent upward movement of the lowermost cover when the latch is in its cover engaging position shown in FIG. 12. The latches 117a are operated in the same manner as previously discussed in connection with FIGS. 7 and 8. As this transfer head rises to contact the lowermost cover in the magazine, the cam 115 will engage the cam faces 117b on the latches and move the pivoted latches so that their lower finger 114a will release the lowermost cover. When the transfer head starts its downward travel to carry the cover to a container, the latches 117a move inwardly and both the upper and lower latch fingers 113a and 114a resume their functional position shown in FIG. 12. The previously described spring 118 may be employed for moving this latch about its pivot 119 and resiliently projecting this latch into cap engaging position. The upper latch finger 113a is, of course, required only when code printing is provided on the machine.

It will be perceived that when the arm 32 starts its upward swing for the purpose of engaging another container cover, the arm 107 will be given a reverse movement by the link 111 which through the gear train will eventually restore the coder 101 to the position shown in FIG. 4.

Figures 14, 15:
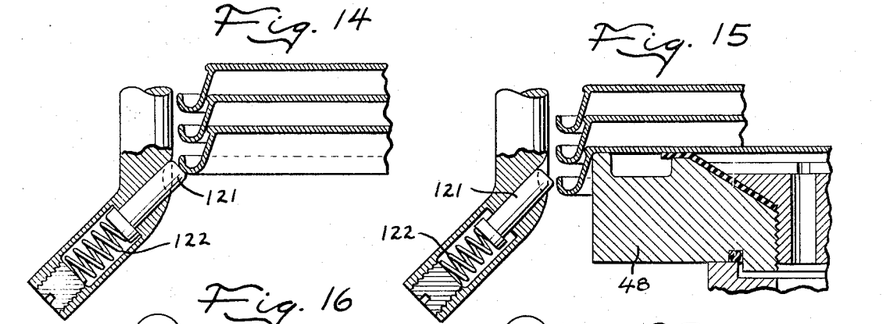
FIG. 14 is a detail, showing another latch mechanism which is recommended for retaining steel container covers.
FIG. 15 is a view showing the latch of FIG. 14 partially retracted by the downward movement by suction of one of such covers.

Additional latches for retaining various kinds of covers are shown in FIGS. 14-18. In FIGS. 14 and 15 at intervals around the cover magazine, there may be stationed in any suitable manner, pins 121 normally projected by springs 122, as shown in FIG. 14. This type of latch is recommended for use with steel lids or covers, and the pins are preferably slidably supported for movement along a path inclined downwardly and outwardly of the cap magazine. When the capper head is withdrawing the bottommost cover from the magazine, the downward pull on this cover will enough to cause the pin 121 to retract and permit the passage of the cover.

Figure 16:
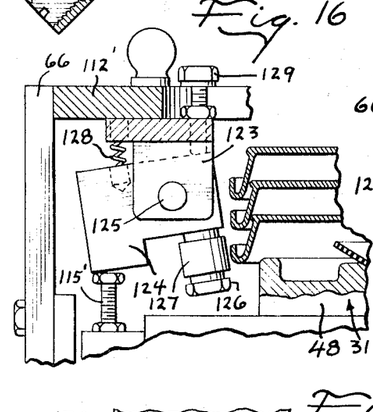
FIG. 16 is a detail, showing another type of latch which may be used with paper lids.
Figure 17:
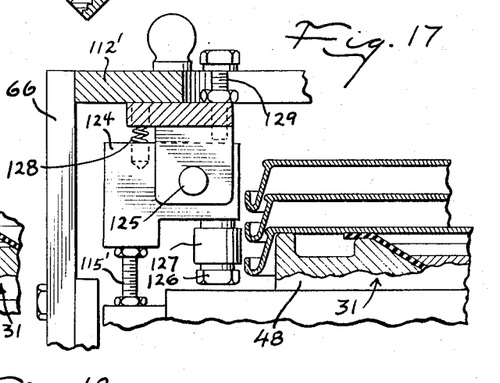
FIG. 17 shows the latch of FIG. 16 released by the upward movement of the transfer suction head.

A further modified form of latch is illustrated in FIGS. 16 and 17. This latch is particularly suitable for retaining covers such as paper and fiber covers that may become permanently distorted if excessive radial pressure is applied. This latch includes a bracket 123 secured to the underside of the support ring 112' of the cover magazine. A latch block 124 is pivoted at 125 on the bracket and a latch finger, herein shown in the form of a bolt 126 carrying a resilient sleeve 127, is mounted on the block. The block is yieldably urged in a direction to move the latch finger inwardly into engagement with the periphery of the lowermost cover in the stack by a spring 128 and a stop, conveniently in the form of an adjustable bolt 129, limits inward movement of the latch finger. Apparatus is provided for moving the latch finger to a release position when the capping head is in its cover seizing position. As shown in FIGS. 16 and 17, an actuator 115' is mounted on the head and engages the block at point outwardly of the pivot 125 to move the finger to its release position as shown in FIG. 17 during removal of a cover from the magazine.

Figure 18:
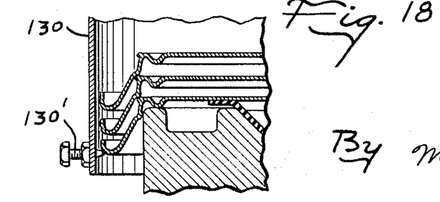
FIG. 18 is a detail, showing another means for retaining plastic covers in a magazine therefor, employing a simple pin instead of a pivoted latch.

A further modified form of cover magazine and latch is shown in FIG. 18 which is suitable for certain types of covers such as many plastic covers that are sufficiently resilient to accommodate some radial compression without permanent distortion. In this embodiment the magazine includes a sleeve 130 adapted to be attached in any suitable manner to the support ring 112' of the cover magazine. A plurality of adjustable pins 130' are provided at circumferentially spaced points around the sleeve to underlie and support the lowermost cover in the stack. Due to the flexibility of such plastic covers, the cover rims can flex inwardly and snap past the stop pins when the capper head moves downwardly to withdraw the lowermost cover.

Referring now to FIGURE 1, it is essential that provision be made in the conveyor mechanism for intermittently advancing the containers to the capping station and for accurately positioning the container at the capping station. In the conveyer mechanism disclosed in the aforementioned patent to Anderson, the conveyer is of the continuous belt type and stops designated 133a, 133b and 133c are provided at the filling, liner placement and capping stations respectively for arresting the progress of the container along the conveyer so that they may register accurately with the filling mechanism, the liner placement mechanism and the cover capping mechanism. The conveyer mechanism also advantageously employs elevating platforms 131 and 132, at least at the filling and capping stations, to raise the containers above the conveyer during filling and capping. As also more fully disclosed in the aforementioned Anderson patent, the elevation platforms and container stops are operated by cams driven in timed relation with the conveyer 21 and with the slide 90'' that operates the capper. The container stop fingers such as 133a–133c are intermittently extended through or between the conveyer wires to oppose the advance of the containers on the continuously moving endless belt 21, and these fingers are retracted after each operation to permit further advance of the containers. The stop fingers are adjustable longitudinally of the conveyer and the lateral guides such as 134 are laterally adjustable relative to the conveyer to enable the containers to be positioned accurately for receiving the liners and their covers, as well as adjusted to accommodate the filling and capping of containers of various diameters, all of which features are shown in said patent.

When containers are being filled and capped and do not require code printing, the coder may readily be rendered inoperative merely by removing the code plate 99, or in some other suitable manner.

The capping apparatus of this invention is especially well suited and is actually designed for cooperation with the filling and conveyer equipment shown in the aforementioned Anderson Patent No. 2,029,299, and may be coordinated therewith as shown in FIGURE 1 of the drawings of this application. In so doing, the liner transferring and cover transferring mechanism of this invention will be substituted for the cover transferring and applying mechanism of the prior patent and coordinated in timed relation with the filling and conveyer mechanism of that patent. Also, the reciprocating shuttle herein which actuates arm 32 herein and the air control valve 43 may be operated in the same manner and in the same timed relation as is the shuttle of the patent.

While an illustrative embodiment of the invention is shown and described in considerable detail herein, it should be understood that the invention is not limited thereto, but embraces all modifications and variations which fall within the scope of the claims appended hereto.

I claim:

1. In a container filling machine including a frame structure having a filling station and a capping station, a conveyer system for advancing containers in step fashion past the filling and capping station, and a slide mounted on the frame structure at the capping station for horizontal reciprocation in a direction crosswise of the conveyer in timed relation with the movement of the conveyer system, a capping apparatus at said capping station including a cover magazine mounted on the frame structure for retaining covers in an inverted position, a combined cover feed and capping means including an arm, means mounting said arm on said frame structure for movement in a generally upright plane, means operatively connected to said slide for raising and lowering said arm as said slide reciprocates, a suction and capping head mounted on said arm for raising and lowering movement therewith and for pivotal movement relative to the arm about a generally horizontal axis, a suction cup on said head, means operative in response to raising of said arm for pivoting said head about said horizontal axis relative to said arm to a first position in which said suction cup faces upwardly to engage the suction cup with the lowermost cover in the magazine and operative in response to downward movement of said arm for pivoting said head about said horizontal axis relative to said arm to a second position in which said suction cup faces downwardly to apply the cover to a container, means including a valve for applying vacuum to said suction cup, and means operatively connected to said slide for operating said valve in timed relation with the movement of said arm.

2. In a machine for applying covers to receptacles, a machine frame, a receptacle support, a cover magazine adapted for retaining covers in an inverted position, combined cover feed and capping means including an arm pivoted on said frame, a suction and capping head pivoted on said arm, a suction cup mounted on said head, a first cam extending generally horizontally and mounted on said arm, a second cam extending generally vertically and mounted on said frame, a shuttle mounted on the frame for horizontal reciprocation having means coacting with said first cam adapted for oscillating the arm about its pivot, means on said head coacting with the second cam during oscillation of the arm for oscillating said head between cover seizing position and cover capping position, means on said head adapted for pressing a cover firmly upon a receptacle positioned on said support when said arm is in cover capping position, and means operative in timed relation with the oscillation of said arm for applying suction to said cup when the cup is at cover seizing position and disconnecting suction from the cup just before it reaches cover capping position.

3. In a machine for applying covers to receptacles, a machine frame, a receptacle support, a cover magazine extending above said support adapted for retaining covers in an inverted position, combined cover feed and capping means including an arm pivoted on said frame, a suction and capping head pivoted no said arm, a suction cup mounted on said head, a first cam mounted on said arm, a second cam mounted on said frame, a shuttle mounted on the frame for horizontal reciprocation having means coacting with the first cam adapted for oscillating the arm vertically about its pivot, means coacting with said second cam during oscillation of the arm adapted for oscillating said head between a position for cover seizing and a reversed position for cover capping, means on said head adapted for pressing a cover firmly upon a receptacle positioned on said support when said arm is in cover capping position, and means actuated by said shuttle operative in timed relation with the oscillation of said arm for applying suction to said cup.

4. In a capping machine for applying covers to receptacles, a machine frame, a receptacle support on said frame, a cover magazine adapted for retaining covers in an inverted position, an arm pivoted on said frame on a horizontal axis, a cover transfer head pivoted on said arm on a horizontal axis, means including a cam fixed on said arm and a horizontal reciprocable shuttle acting on said cam adapted for rocking said arm about its pivot, said head having annular means thereon engageable with a cover when pressing the cover down upon a receptacle positioned on said support, a suction cup positioned on said head within said annular means, means including a valve actuated by said shuttle in timed relation with the rocking of said arm for applying suction to the cup, means operative during the upward swing of the arm for rotating said head to present the cup against a cover in the magazine for seizing the cover by suction and further operative during downward swing of the arm to invert said head as the cup retains the cover and to cause said annular means to press the cover onto a receptacle.

5. In a machine for applying liners and covers to receptacles, a machine frame, a receptacle support on said frame, a cover magazine adapted for retaining covers in an inverted position, a receptacle liner magazine positioned above said support laterally of said cover magazine, an arm pivoted on said frame on a horizontal axis, a cover transfer head means including a rotatable hollow shaft axially extending from said head pivotally mounting said head on said arm on a horizontal axis, a first suction cup fixed on said shaft beneath said liner magazine, means for rocking said arm about its pivot, said head having annular means thereon engageable with a cover when pressing the cover down upon a receptacle positioned on said support, a second suction cup positioned on said head within said annular means, means operative in timed relation with said rocking means for applying suction to both of said cups through said shaft, means operative during upward swing of said arm adapted for rotating said head and said shaft to present the second suction cup against a cover in the cover magazine for seizing the cover by suction and further operative during downward swing of the arm to rotate the head and shaft as the second cup retains the cover and to cause said annular means to press the cover onto a receptacle, the first suction cup being operative during the foregoing operations of said head to seize a liner and transfer it to the top of a receptacle on said support.

6. The combination of claim 5 with the addition of means for disconnecting suction from both cups as they place the liner and cover, respectively, upon said receptacles.

7. In a machine for applying skirted covers to containers, a container support, a cover magazine above said support adapted for retaining the covers in inverted position, an arm pivotally supported at one of its ends on a horizontal axis, a hollow horizontal shaft rotatably supported on the other end of said arm, a cover transfer head fixed on said shaft to rotate therewith, sharply defined annularly extending means on said head proportioned and adapted for engaging the top surface of the cover at its juncture with the cover skirt for centering the cover on the head, additional annularly extending means on said head radially and axially spaced from the first annular means adapted for applying pressure to the skirt during a capping operation, a suction cup on said head communicating with said hollow shaft and positioned within said annular means adapted for drawing the cover against said annular means, a cam secured to and depending from said arm extending lengthwise thereof, a shuttle horizontally reciprocable in a vertical plane lengthwise of said arm having a cam follower engaged with said cam adapted for rocking said arm vertically, means including a valve for supplying air pressure or suction selectively to said hollow shaft, means carried by said shuttle for actuating said valve, a vertically extending cam positioned laterally of said arm, and a cam follower fixed on said shaft engageable with said vertical cam adapted for rotating said cover transfer head between cover seizing position and cover capping position during vertical rocking of said arm.

8. In a machine for applying to receptacles covers each having a central depressed portion surrounded by a peripheral skirt shaped to snugly embrace the receptacle mouth, a machine frame, a receptacle support, a cover magazine above said support adapted for retaining the covers in inverted position, a rigid cover transfer head having an annular shoulder proportioned to engage the said central cover portion at its juncture with said skirt, a suction cup inwardly of said shoulder adapted when activated to draw and position and center a cover snugly upon said head and to align said shoulder with said juncture, an arm pivotally mounted at one end on said frame and pivotally supporting said head on its other end, a cam fixed on said arm, a horizontally reciprocable shuttle coacting with said cam for rocking said arm between cover seizing and cover capping positions, a second cam fixed on said frame, a cam follower on said head engageable with the second cam during rocking movement of said arm adapted to rotate the head to present said cup and head against a cover in the magazine to seize the cover on the upward movement of the arm and to reversly rotate the head on the downward movement of the arm to place the seized cover firmly upon a receptacle positioned on said support, and means operable in timed relation with the reciprocation of said shuttle for applying suction to said cup when at its cover seizing position and for disconnecting suction at the cover placing position.

9. In a machine for applying skirted covers to containers, a machine frame, a conveyer mechanism supported on said frame, a cover magazine positioned above the conveyer and adapted to retain covers in an inverted position, an arm pivotally supported at one of its ends on a horizontal axis on said frame, a hollow horizontal shaft rotatably supported on the other end of said arm, a cover transfer head fixed on said shaft to rotate therewith, annular means on said head proportioned and adapted for engaging the outer central surface of the cover at its juncture with said skirt for centering the cover on said head, a suction cup on the head within said annular means adapted when suction is applied thereto for drawing a cover firmly onto the head with said annular means aligned with said juncture, said suction cup communicating with the interior of said shaft, a cam secured to and depending from said arm extending lengthwise thereof, a shuttle horizontally reciprocable in a plane parallel to the arm and having a cam follower engaged with said cam adapted for rocking the arm vertically, a vertically extending cam fixed on said frame, means mounted integrally with said shaft engaging the vertical cam adapted during upward rocking of the arm for inverting said head to present the suction cup against the lowermost cover in said magazine and upon downward rocking of the arm to reverse said head and a cover carried thereby and apply the cover to a container on said conveyer mechanism, means including a valve for applying suction to said cup for seizing a cover retained by said magazine, means operatively connected with said shuttle adapted for actuating said valve, latch means for holding the lowermost cover in the magazine against displacement by an upward thrust applied thereto, a printing lever pivoted on said frame above said arm having a printing plate thereon and swingable to present said plate against the outer face of said lowermost cover, an upwardly facing inking pad mounted on said arm contacting the printing plate in the raised position of the arm and means operated by the downward rocking of said arm adapted for swinging said lever to printing position.

10. In a machine for applying covers to containers, a cover magazine adapted for retaining covers in inverted position, cover transfer means including an arm positioned below said magazine having one of its ends pivotally mounted on a horizontal axis, a suction transfer head rotatably supported on the other end of said arm adapted by one movement of the arm to contact and seize by suction a lowermost cover in said magazine and by another movement of the arm to reverse the cover and apply it to a container, and means operated by the second movement of the arm for printing code indicia on the downwardly facing surface of a lowermost cover in said magazine.

11. In a machine for applying covers to containers, a cover magazine adapted for retaining covers in inverted position, cover transfer means including an arm positioned below said magazine having one of its ends pivotally mounted on a generally horizontal axis, a suction transfer head rotatably supported on the other end of said arm adapted during upward movement of the arm to contact and seize by suction a lowermost cover in said magazine and during downward movement of the arm to reverse the cover and apply it to a container, a plurality of latches pivotally and resiliently mounted on said magazine, each latch having a finger normally holding down an upwardly facing surface of the lowermost cover and another finger engaging a downwardly facing surface of said cover, and means on said suction head adapted to retract all said latches and the fingers thereof as the suction head moves into cover seizing position.

12. In a machine for applying skirted covers to wide mouthed containers, a cover magazine adapted for retaining skirted covers in inverted position, an arm positioned below said magazine having one of its ends pivotally mounted on a horizontal axis, the other end of said arm being provided with a horizontally extending bore, a hollow shaft rotatably journaled in said bore with a sealed annular chamber in the bore surrounding part of the shaft intermediate the ends thereof, a suction tube supported on said arm and fixed in a wall of the bore communicating with said chamber, a port in the shaft establishing communication between said chamber and the hollow interior of the shaft in all rotative positions of the shaft in said bore, a cover transfer head fixed on said shaft, a suction cup fixed on said head, and means including a member fixed on said shaft adapted for rotating said shaft and thereby said head between cover seizing and cover applying positions of the head during vertical rocking movements of said arm, the head and shaft having passages establishing communication between said cup and the hollow interior of the shaft at all rotative positions of said head.

13. In a machine for applying covers to containers, a cover magazine adapted for retaining covers in an inverted position, a cover transfer head, means supporting the cover transfer head for movement between a raised generally upwardly facing position engaging and seizing the lowermost cover in the magazine and a lowered downwardly facing position to reverse the lowermost cover and apply it to a container, head operating means for moving said head from said raised position to said lowered position, indicia applying means including a printing head mounted for movement into and out of engagement with the lowermost cover in the magazine for printing code indicia on the downwardly facing surface of the lowermost cover in the magazine, and means for operating said indica applying means to move the printing head into engagement with the lowermost cover in the magazine as the cover transfer head is moved to said lowered position and to move the printing head out of engagement with the lowermost cover in the magazine as the cover transfer head is moved to said raised position.

14. A machine according to claim 13 including latch means on the magazine for engaging an upwardly facing surface on the lowermost cover to hold the cover down during printing on the lowermost cover.

References Cited by the Examiner
UNITED STATES PATENTS

| | | | |
|---|---|---|---|
| 1,919,060 | 7/1933 | Harder | 53—307 |
| 2,736,258 | 2/1956 | Vedder | 53—307 X |
| 2,849,847 | 9/1958 | Anderson | 53—310 |
| 2,894,361 | 7/1959 | Ullman et al. | 53—40 |

FRANK E. BAILEY, *Primary Examiner.*

R. L. FARRIS, *Assistant Examiner.*